United States Patent
Irgang et al.

(10) Patent No.: US 10,875,444 B2
(45) Date of Patent: Dec. 29, 2020

(54) ILLUMINATION DEVICE FOR A VEHICLE

(71) Applicant: Rebo Lighting & Electronics, LLC, Ann Arbor, MI (US)

(72) Inventors: Todd Irgang, Saline, MI (US); Jack Bodem, Kokomo, IN (US); Scott Schoeff, Ypsilanti, MI (US)

(73) Assignee: REBO LIGHTING & ELECTRONICS, LLC, Ann Arbor, MI (US)

( * ) Notice: Subject to any disclaimer, the term of this patent is extended or adjusted under 35 U.S.C. 154(b) by 201 days.

(21) Appl. No.: 15/433,800

(22) Filed: Feb. 15, 2017

(65) Prior Publication Data

US 2017/0238277 A1   Aug. 17, 2017

Related U.S. Application Data

(60) Provisional application No. 62/295,917, filed on Feb. 16, 2016.

(51) Int. Cl.
*F21V 7/00* (2006.01)
*B60Q 1/00* (2006.01)
(Continued)

(52) U.S. Cl.
CPC .......... *B60Q 1/0094* (2013.01); *B60Q 1/22* (2013.01); *B60Q 1/24* (2013.01); *F21S 41/192* (2018.01);
(Continued)

(58) Field of Classification Search
CPC .......... B60Q 1/0094; B60Q 1/24; B60Q 1/22; F21S 41/365; F21S 43/14; F21S 41/192;
(Continued)

(56) References Cited

U.S. PATENT DOCUMENTS 4,087,682 A * 5/1978 Kolodziej ........ B29D 11/00605
362/297
5,394,317 A * 2/1995 Grenga .................. F21V 7/005
362/297
(Continued)

FOREIGN PATENT DOCUMENTS

EP   1895228 A1   3/2008
EP   2372234 A2   10/2011

OTHER PUBLICATIONS

International Preliminary Report on Patentability and Written Opinion for Application No. PCT/US2017/017996 dated Aug. 30, 2018; 13 pages.
(Continued)

*Primary Examiner* — William J Carter
*Assistant Examiner* — Omar Rojas Cadima
(74) *Attorney, Agent, or Firm* — Reising Ethington, P.C.

(57) ABSTRACT

An illumination device, such as the type used for vehicle exterior applications, includes a housing with light collimating and spreading portions, a circuit card assembly with one or more light sources (e.g., LEDs), and a lens. The illumination device may be arranged so that light emitted by the LEDs reflects off of a metalized interior surface of the light collimating portion in a collimated fashion and travels towards the light spreading portion, the collimated light then reflects off of a metalized interior surface of the light spreading portion in a spread fashion and travels towards the lens, and the spread light passes through the lens and travels towards an intended target region. The illumination device may be installed, for example, in a rear hatch of a vehicle and used in conjunction with a backup camera.

20 Claims, 3 Drawing Sheets

(51) Int. Cl.
*B60Q 1/22* (2006.01)
*F21S 41/19* (2018.01)
*B60Q 1/24* (2006.01)
*F21S 43/14* (2018.01)
*F21S 41/365* (2018.01)
*F21Y 115/10* (2016.01)
*F21S 41/147* (2018.01)
*F21S 45/47* (2018.01)
*F21S 45/50* (2018.01)
*F21S 41/151* (2018.01)

(52) U.S. Cl.
CPC .............. *F21S 41/365* (2018.01); *F21S 43/14* (2018.01); *F21S 41/147* (2018.01); *F21S 41/151* (2018.01); *F21S 45/47* (2018.01); *F21S 45/50* (2018.01); *F21Y 2115/10* (2016.08)

(58) Field of Classification Search
CPC .......... F21S 41/36; F21S 41/147; F21S 45/50; F21S 45/47; F21Y 2115/10
See application file for complete search history.

(56) References Cited

U.S. PATENT DOCUMENTS

| | | | |
|---|---|---|---|
| 5,774,273 A | 6/1998 | Bornhorst | |
| 6,238,073 B1 * | 5/2001 | Ito | B60Q 1/0052 362/236 |
| 6,488,395 B2 | 12/2002 | Woodward | |
| 6,915,062 B2 | 7/2005 | Hulse | |
| 7,513,654 B2 | 4/2009 | Okada | |
| 7,762,701 B2 | 7/2010 | Luo | |
| 8,449,159 B2 | 5/2013 | Rice | |
| 8,727,574 B2 | 5/2014 | Simchak | |
| 8,770,800 B1 * | 7/2014 | Yriberri | F21V 7/0025 362/302 |
| 2002/0149946 A1 | 10/2002 | Malone | |
| 2007/0274084 A1 * | 11/2007 | Kan | F21V 5/002 362/373 |
| 2009/0027892 A1 | 1/2009 | Bremerich | |
| 2009/0236825 A1 | 9/2009 | Okuda et al. | |
| 2009/0296416 A1 * | 12/2009 | Luo | F21K 9/00 362/487 |
| 2011/0013412 A1 | 1/2011 | Kobayashi | |
| 2011/0164398 A1 * | 7/2011 | Holten | F21V 7/0008 362/84 |
| 2011/0317442 A1 * | 12/2011 | Makiuchi | F21S 43/40 362/519 |
| 2014/0056008 A1 * | 2/2014 | Rice | F21S 43/31 362/346 |
| 2014/0125795 A1 * | 5/2014 | Yerke | B60R 1/00 348/118 |

OTHER PUBLICATIONS

PCT Search Report and Written Opinion for Application No. PCT/US2017/017996 dated May 24, 2017, 15 pages.

* cited by examiner

ILLUMINATION DEVICE FOR A VEHICLE

RELATED APPLICATIONS

This application claims the benefit of U.S. Provisional Application No. 62/295,917 filed Feb. 16, 2016, the contents of which are hereby incorporated by reference in their entirety.

FIELD

This invention generally relates to an illumination device and, more particularly, to an illumination device that may be installed on a vehicle, such as on a rear side of a vehicle near a backup camera.

BACKGROUND

Illumination devices, particularly those used on vehicles, are oftentimes required to illuminate an intended target area with an illumination pattern that meets certain performance requirements, however, satisfying those requirements with a cost-effective device can be challenging.

For example, a vehicle exterior illumination device may be required to illuminate an area behind a vehicle with an illumination pattern that requires, at least at some point in its delivery, for the light to be both collimated and non-collimated or spread. But providing an illumination device with separate collimated and non-collimated optics or lenses will generally increase the cost of the device. Another potential performance requirement involves thermal management, particularly thermal management of electrical components connected to a circuit board. Skilled artisans will understand that some thermal management issues can be addressed by providing a separate heat sink that actively removes heat from the electrical components and/or the circuit board, but such heat sinks also add cost and complexity to the device.

Therefore, it would be desirable to provide an illumination device design that successfully addressed the performance requirements listed above, as well as others, but did so in a cost effective way.

SUMMARY

According to one embodiment, there is provided an illumination device comprising a housing and a circuit card assembly. The housing includes a light collimating portion and a light spreading portion, and the circuit card assembly includes at least one light source. The illumination device is arranged so that light emitted by the light source reflects off of an interior surface of the light collimating portion and an interior surface of the light spreading portion before exiting the illumination device.

According to another embodiment, there is provided an illumination device comprising a housing, a circuit card assembly, and a lens. The housing includes a light collimating portion and a light spreading portion and is a single unitary component made of a molded plastic. The light collimating portion includes at least one reflective cavity with a metalized interior surface, and the light spreading portion includes a plurality of individual reflective features with metalized interior surfaces. The circuit card assembly is attached to the housing and includes at least one top-firing light emitting diode (LED). The circuit card assembly covers a substantial portion of a footprint of the housing, but stops short of covering the entire footprint of the housing so that a window is formed where light can escape an interior space of the housing. The lens is attached to the housing. The illumination device is arranged so that: light emitted by the top-firing LED reflects off of the metalized interior surface of the reflective cavity in a collimated fashion and travels towards the light spreading portion, the collimated light reflects off of the metalized interior surfaces of the individual reflective features in a spread fashion and travels towards the window, and the spread light passes through the window and the lens and travels towards an intended target region.

According to another embodiment, there is provided a method of operating an illumination device that comprises a housing with a light collimating portion and a light spreading portion and a circuit card assembly with at least one light source. The method may comprise the steps of: powering the circuit card assembly so that the light source emits light towards the light collimating portion of the housing; arranging the illumination device so that the emitted light reflects off of an interior surface of the light collimating portion in a collimated fashion so that it travels towards the light spreading portion; arranging the illumination device so that the collimated light reflects off of an interior surface of the light spreading portion in a spread fashion so that it travels towards an opening at the bottom of the housing; and allowing the spread light to exit the opening at the bottom of the housing so that it travels towards an intended target region.

DRAWINGS

Preferred exemplary embodiments of the invention will hereinafter be described in conjunction with the appended drawings, wherein like designations denote like elements, and wherein.

DESCRIPTION

Figure 1:
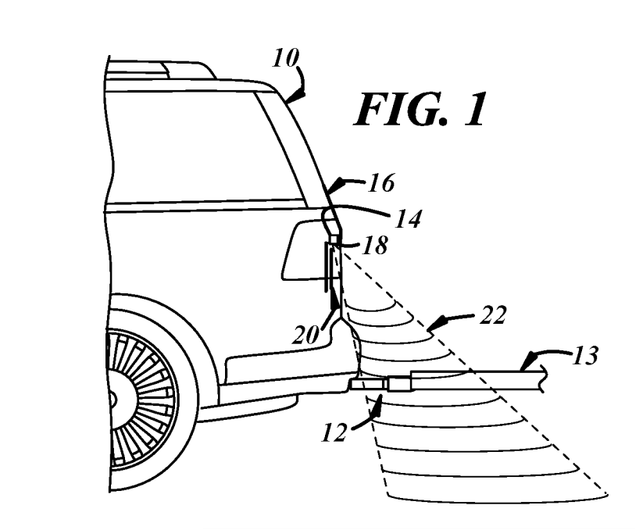
FIG. 1 illustrates a partial view of a vehicle having a hitch connected to a trailer, wherein a rear hatch of the vehicle carries an illumination device that illuminates an area surrounding the hitch.

FIG. 1 illustrates one possible implementation of an illumination device, which in this case involves a rear end of a sports-utility vehicle 10 that has a hitch 12 coupled to a trailer 13 (only a portion of which is shown). In this embodiment, an illumination device 14 is carried by and is partially hidden within a vehicle rear hatch exterior panel 16 that has an undercut shelf or overhanging region 18 for accommodating a vehicle license plate 20. FIG. 1 also illustrates an illuminated path or region of directed light 22 behind the vehicle 10 that extends from the illumination device 14 towards an area surrounding the hitch 12 (e.g., an intended target region). It should be appreciated that the illumination device 14 is not limited to the exemplary implementation shown in FIG. 1, as that is just one example, and that the illumination device could instead be implemented in many other vehicle and non-vehicle applications. Non-limiting examples of such applications include vehicle exterior locations like underneath side-view mirrors, vehicle interior locations like in the ceiling, as well as various non-vehicle applications such as exterior and interior lighting for buildings, homes, etc., to name a few of the possibilities.

Figure 2:
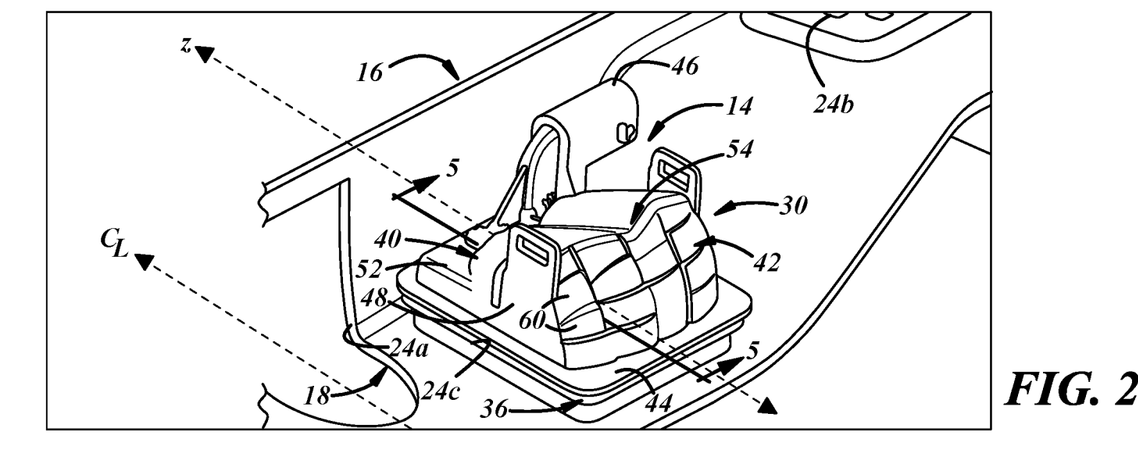
FIG. 2 is a perspective view of the illumination device from within an exterior panel of the rear hatch.

FIG. 2 shows the vehicle rear hatch exterior panel 16 having several different openings. In this example, a keyhole-shaped opening 24a is provided for a vehicle rear view camera (e.g., typically located along a vehicle longitudinal centerline $C_L$), another opening 24b is provided for a license plate lamp, and another opening 24c is provided therebetween for the illumination device 14 (the device 14 is shown here mounted over top of the opening 24c). The illumination device 14 provides lighting to the intended target region behind the vehicle and may, for example, be used in conjunction with a backup camera (not shown) in order to assist the driver when connecting the trailer 13 to the vehicle hitch 12. Again, other embodiments are also possible.

Figure 3:
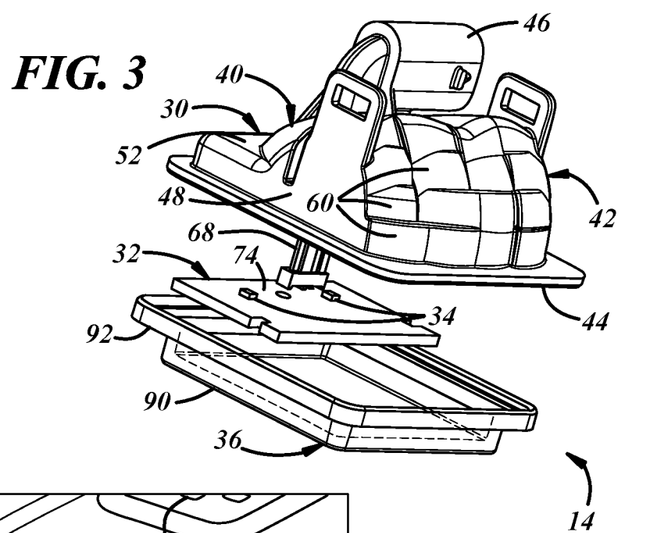
FIG. 3 is an exploded perspective view of the illumination device shown in FIG. 2 which includes a housing, a circuit card assembly, and a lens.
Figure 4:
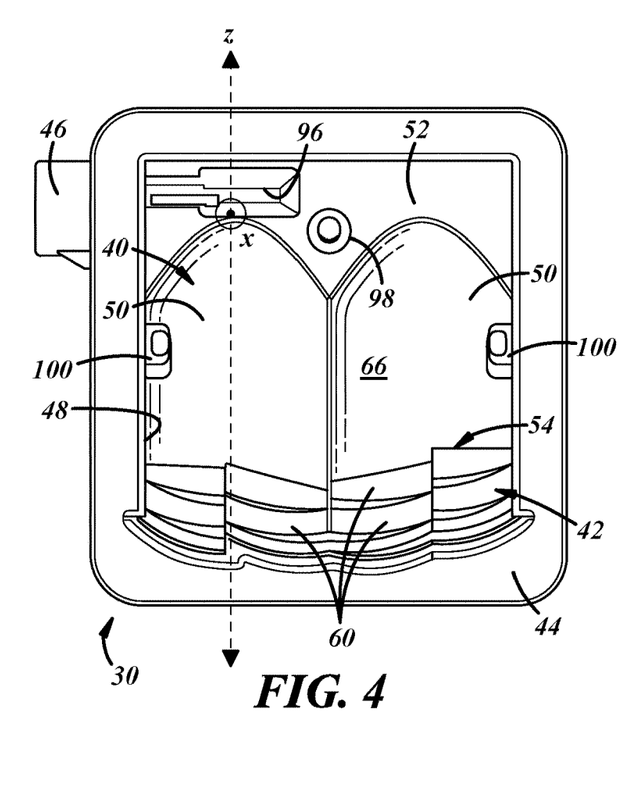
FIG. 4 is a bottom view of the housing shown in FIG. 3.
Figure 5:
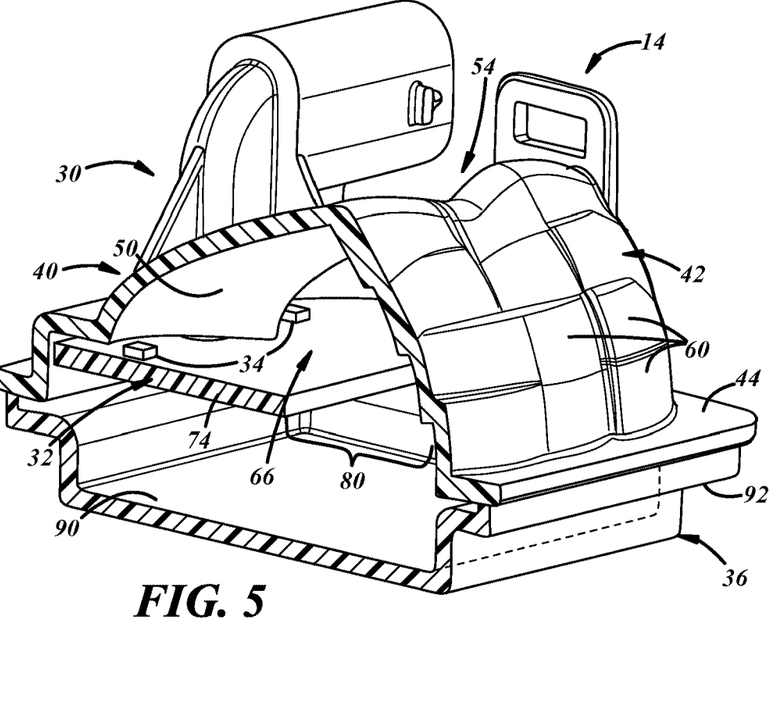
FIG. 5 is a partial cut-away perspective view of the illumination device shown in FIG. 2 along section lines 5-5.

FIGS. 3-5 illustrate different perspectives of the illumination device 14 and portions thereof. As best shown in the exploded view of FIG. 3, the illumination device 14 generally includes a housing 30, a circuit card assembly 32 carrying at least one light source 34 (two are shown), and a lens 36. The illumination device 14 is designed to enable a significant amount of light to be extracted from a relatively small part and to be emitted through a relatively narrow opening, thus, enabling the device to provide impressive illumination while still being contained in a compact package. Furthermore, by integrating both light collimating and light spreading portions in a single unitary component, as will be explained, the housing 30 acts as a cost effective, complex reflector with the ability to direct light with precision in a desired beam pattern. Skilled artisans will appreciate that, due to geometric and other packaging constraints, it can sometimes be difficult to place a light source at a focal point of such a complex reflector and still provide an adequate opening that allows the resultant light to reach its intended target region. This is particularly true when the illumination device uses a larger circuit board, for example, to dissipate heat and avoid the need for a separate heat sink, as the larger circuit board can occlude such an opening. The present design for illumination device 14 addresses these and other objectives.

Housing 30 is designed to perform a number of different functions, such as protecting interior portions of the illumination device 14 from contaminants and providing multiple reflective surfaces for directing light to an intended target region. According to one embodiment, the housing 30 is a single molded part or component (e.g., a molded plastic like acrylonitrile butadiene styrene (ABS) or polycarbonate) and it includes a light collimating portion 40, a light spreading portion 42, a flange portion 44, an electrical connector portion 46, and first and second end portions 48. As will be explained in more detail, the underside or interior surfaces of the light collimating and spreading portions 40, 42 are reflective (e.g., they may be metallized or otherwise coated with reflective coatings) so that the housing can provide both light collimation and spreading with the use of a single molded component.

Light collimating portion 40 makes up a significant portion of the domed structure of the housing 30 and, as its name suggests, is designed to reflect light in a collimated fashion. As shown in the underside view of FIG. 4, the illustrated embodiment has a light collimating portion 40 with two side-by-side reflective cavities 50, each of which is arranged to reflect and collimate light from a corresponding light source 34, in this case a light emitting diode (LED). In this particular embodiment, the reflective cavities are identical and each cavity 50 is located over top of a corresponding LED 34 and has a parabolic or paraboloid shaped configuration so that the LED is located at or near a focal point of that geometric shape. Because they are identical, only one of the reflective paraboloid cavities 50 is described below, with the understanding that the description applies equally to both cavities. Reflective cavity 50 may include a smooth, metallized interior surface that extends from a base area 52 near the flange portion 44 to an apex area 54 where the light collimating portion 40 meets or joins the light spreading portion 42. According to the orientation shown in FIGS. 3 and 5, the reflective cavity 50 is smooth and convex in that it bows or curves outward away from the light source 34 with which it cooperates and, thus, helps form a dome-like portion of the housing 30. The apex area 54 is where the light collimating and light spreading portions 40, 42 converge together in the shape of a ridge or peak. In the illustrated example, the apex area 54 includes two humps or peaks, one for each of the reflective paraboloid cavities 50 of the light collimating portion 40; other apex or ridge configurations may be used instead.

As best shown in the underside perspective of FIG. 4, the greatest or largest dimension of the reflective cavity 50 may extend along a longitudinal axis (z-axis) from the base area 52 (a first end) to the apex area 54 (a second end). Although not necessary, it may be desirable for the longitudinal axis (z-axis) of the cavity 50 to be parallel or otherwise aligned with the center line CL of the vehicle. The reflective cavity 50 may be at least partially defined by a three-dimensional (3-D) equation (e.g., a parabolic equation such as $z=ax^2+bx+c$ (where a, b, and c are predetermined constants, where x is an independent axis with respect to the z-axis (the x-axis would be directed into the page in FIG. 4), and where the three-dimensional shape of the parabolic is defined by the rotation of the parabolic equation around the z-axis). Of course, it is not necessary for the entire surface of the reflective cavity 50 to be smooth and parabolic in shape, as it is possible for only a portion of that surface to be parabolic or for cavity 50 to have some other suitable shape and/or surface features that can help collimate light from the light source 34. In alternative embodiments, the light collimating portion 40 includes only a single reflective cavity 50, three or more reflective cavities, non-identical reflective cavities, or some combination thereof.

Light spreading portion 42 also makes up a significant portion of the domed structure of the housing 30 and, as its name suggests, is designed to reflect light in a spread or pattern-forming manner. The light spreading portion 42 extends from the flange portion 44 up to the apex area 54 and may be convex in that it bows or curves outward away from the light source 34. At the apex area 54, the light spreading portion 42 integrally meets and joins with the light collimating portion 40 so that the housing 30 is a single piece, as already explained. The light spreading portion 42 may include any number of different reflective features to give it its desired light pattern including, but not limited to, a number of individually curved facets 60. As illustrated in the drawings, the light spreading portion 42 may including a matrix-type distribution of curved facets 60 that are divided into different rows and columns (the illustrated example shows an arrangement with four rows and four columns of facets 60). Each of the facets 60 may be a curved rectangular element that abuts, joins, overlaps or is otherwise arranged next to one or more adjacent facets so that together the facets 60 can make up a majority of an interior surface of the light spreading portion 42. The aforementioned example only represents one possibility; the facets 60 may be curved, flat, angular, etc., they may be rectangular, circular, triangular, hexagonal, octagonal, etc., or they may take on any other suitable configuration so long as they can suitably spread and/or distribute the reflected light as desired.

Flange portion 44 extends around at least a portion of a bottom periphery of the housing 30. The flange portion 44 may be designed to help seal and protect an interior space 66 from moisture, contaminants and the like, as well as to help mount the illumination device 14 to the vehicle or some other suitable environment. In the example illustrated in the drawings, the flange portion 44 completely surrounds the bottom or base of the housing 30 and is configured to mate and seal against a corresponding flange of the lens 36. Skilled artisans will appreciate that any number of different sealing features, such as rubber or elastomeric gaskets and other seals, could be used to hermetically seal off the interior space 66. The same applies to mounting features, as any number of different suitable mounting features could be used to attach the flange portion 44 to the other components of the illumination device 14 and/or to its intended environment. Base area 52, which is located adjacent to the flange portion 44, may be sized and shaped to accommodate the circuit card assembly 32 such that, following assembly of the illumination device 14, the circuit card and the light sources 34 which it carries are safely located within the sealed interior space 66.

Electrical connection portion 46 may extend from the base area 52 and/or the flange portion 44 and is designed to receive a wiring harness 68 or some other electrical connection. It should be appreciated that the housing 30 does not have to include a snorkel-like electrical connection portion, as many other embodiments could be used instead. In one instance, the electrical connection portion 46 receives a wiring harness that provides the illumination device 14 with electrical power from the vehicle's low voltage DC power bus, as well as control signals that control signals that dictate the operation of the device.

First and second end portions 48 generally correspond to the ends or sides of the housing 30. According to the example shown in the drawings, the first and second end portions 48 are substantially flat or planar end walls that extend between the light collimating portion 40 on one side, the light spreading portion 42 on another side, and the flange portion 44 on a bottom side. Collectively, the light collimating portion 40, the light spreading portion 42, and the first and second end portions 48 largely define the shape and size of the sealed interior space 66, which both houses the circuit card assembly 32 and provides the space or volume through which light from the light sources 34 collimates and spreads, as it reflects off of various interior surfaces, before exiting the illumination device 14 through the lens 36.

Figure 6:
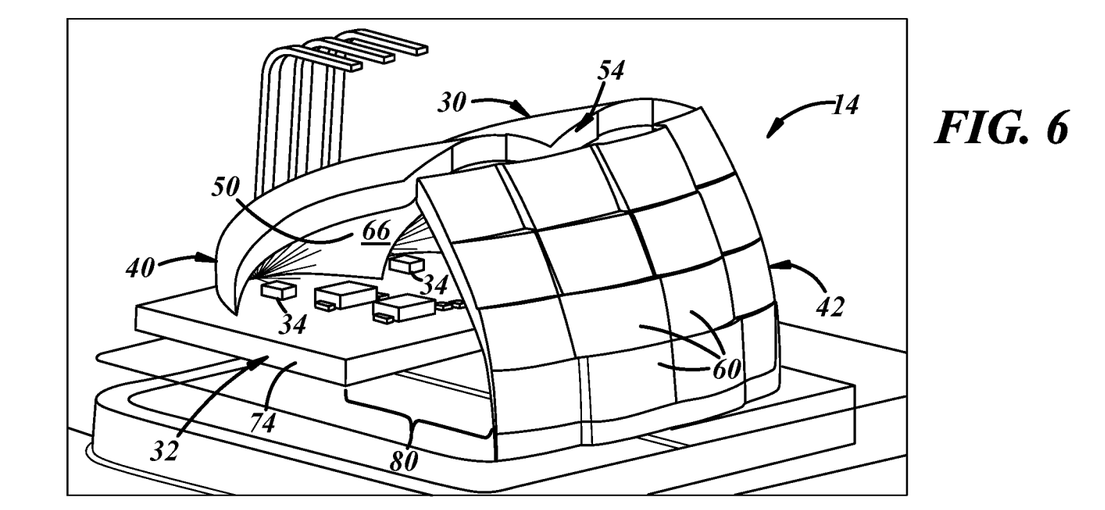
FIG. 6 is also a partial cut-away perspective view of the illumination device shown in FIG. 2, but the housing has an apex area removed and an electrical connection portion removed for illustration purposes.
Figure 7:
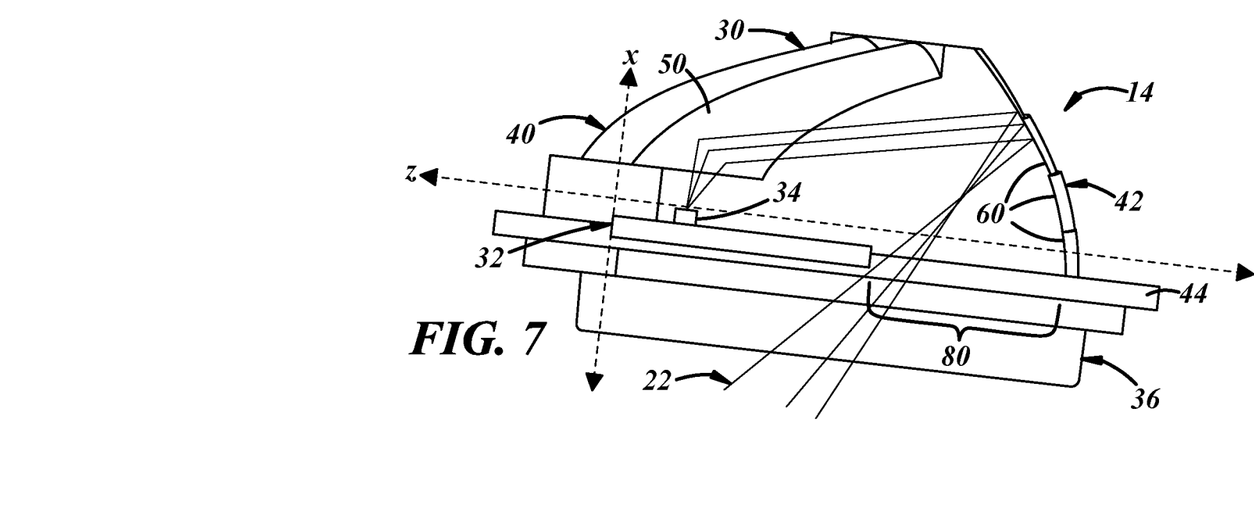
FIG. 7 is a schematic cut-away side view of the illumination device shown in FIG. 2, where some illustrations of light rays have been provided to help explain the operation of the illumination device.

Turning now to FIGS. 5-7, the circuit card assembly 32 is shown (end portion 48 has been removed in these drawings to reveal the circuit card assembly) and may include one or more light sources 34 mounted on any suitable type of circuit card, circuit board or other circuit implementation 74 (e.g., a printed circuit board (PCB), a flexible circuit, etc.). In at least one embodiment, the light sources 34 are top-firing light emitting diodes (LEDs), but other light sources could be used instead. As alluded to above, many conventional illumination devices need to use a separate heat sink in order to remove thermal energy from a circuit and to keep it operating at a sufficiently cool temperature. However, additional heat sinks can undesirably add cost to the device and complexity to the assembly process. The illumination device 14 attempts to thermally manage the device, particularly the LEDs 34, without using a separate heat sink and does so by providing a relatively large circuit card 74 to better dissipate and/or distribute heat put off by the LEDs. While being good at dissipating heat, large circuit cards or PCBs typically are not an option, as they tend to occlude or otherwise block the opening where the light is designed to escape. The illumination device 14 strikes a desirable balance between these competing objectives by providing sufficient amounts of lighting, but is still able to have acceptable thermal management without using a heat sink. As shown in FIG. 7, the circuit card assembly 32 is large enough to cover a substantial portion of the footprint of the interior space 66 (e.g., more than 50% of the footprint or base area defined by the flange portion 44) and thereby sufficiently dissipate the heat generated by the LEDs 34, but it stops short of covering the entire footprint or base area of the interior space and leaves an opening or window 80 so that light within the interior space 66 can escape and illuminate the intended target region.

As used herein, a "separate heat sink" refers to a separate element or device which is coupled to the circuit card assembly 32 and passively or actively transfers heat from the circuit card to a cooling fluid of some kind (e.g., such as air within the interior region 60). Separate heat sinks commonly have fins or blades that provide a greater surface area by which they transfer undesired heat to the cooling fluid, however, such components usually require additional space that is not always available in compact designs.

Lens 36 can include any suitable cover or lens component, and may or may not optically refract the light as it exits the illumination device 14. As shown best in FIG. 3, the lens may include a body 90 and a peripheral flange 92 extending around the outer perimeter of the body. The body 90 may have any suitably shaped surface; however, in at least one implementation, the body is flat and smooth and is not designed to substantially refract the light as it exits the lens. In other implementations, the body 90 of the lens may not be smooth, but instead have some suitable optical features to further redirect the light (e.g., facets, pillow optics, or the like). For example, such optical features could re-collimate the spread-light or further redirect or spread the light. The flange 92 may be sized and shaped to mate and seal against the flange portion 44, as already explained, but this is not necessary as many different arrangements are possible. The lens 36 may be manufactured using any suitable transparent material (e.g., acrylic), including materials used to influence the color of the light, etc. In some embodiments, the lens 36 is an optional component and is not required.

The following is a non-limiting example of how the illumination device 14 is able to accomplish some of the objectives identified above. According to this example, the illumination device 14 is relatively small and compact (e.g., the dimensions of the flange portion 44 are only about 2 inches×2 inches) and the light sources 34 provide a fair amount of luminosity (e.g., LEDs that output up to approximately 80 lumens (lm)), yet the circuit card assembly 32 is able to adequately dissipate excess heat from the LEDs without using a separate heat sink. In addition to the cost of the device being reduced due to the absence of a separate heat sink, the cost of the device is further reduced because the reflective features needed for both collimating and spreading the light are all integrally formed in a single molded housing 30 made from an economical plastic. Such an illumination device is ideally suited for many applications, including vehicle exterior applications such as that illustrated in FIG. 1 where the device illuminates a trailer hitch 12 and/or a corresponding trailer 13.

During assembly, the illumination device 14 may be mounted to its intended environment, such as a vehicle rear hatch exterior panel 16, before or after the device is electrically connected to a wiring harness 68. To electrically connect the illumination device 14, the wiring harness 68 can be fed through the electrical connection portion 46 of the housing, through on opening 90 on the underside of the housing, and plugged into a corresponding electrical connection on the circuit board 74 (see FIGS. 3 and 4). Thus, the circuit card assembly 32, which includes the LEDs 34, may receive power and/or control signals via the wiring harness 68. The circuit card assembly 32 may be fastened to the housing 30 using mounting features 100, which are located on the inside of the housing (see FIG. 4). As best illustrated in the section view of FIGS. 5 and 6, when fixed within the housing 30, the circuit card 74 does not extend over the entire footprint or base area of the housing 30, but instead leaves a gap or opening 80 for the light to escape and illuminate the area of interest, as will be explained. Thereafter, the lens 36 may be attached to the housing 30 and/or the circuit card assembly 32. It should be appreciated that the precise sequence of assembly steps may be application or embodiment dependent, as the present design is not limited to any particular sequence.

According to at least one embodiment, during assembly, each light source 34 may be positioned at or near a focus (or focal point) of a paraboloid cavity 50. For example (in two dimensions or in a plane), the focus may be a predetermined point wherein a set of all points (e.g., in an x-z plane)—which are associated with the parabolic equation defining the focus—are an equal distance therefrom. Similarly, the focus of the three-dimensional paraboloid remains constant when the parabola defined by that equation is rotated about the z-axis. It should be appreciated that the entire paraboloid may not be used in the collimating portion 40; however, whatever portion of the collimating portion 40 is used, the points may be part of an equation having a common focus. The terms "focus" and "focal point" are used herein interchangeably.

During operation, the illumination device 14 both collimates and spreads light so as to provide sufficient illumination to an intended target region. With reference to the schematic illustration of light rays in FIG. 7, the operation of the device is described in conjunction with a single light source, even though it is well contemplated that multiple light sources could and oftentimes will be used, as explained above. When the circuit card assembly 32 is powered (e.g., via wiring harness 68), the LED 34 is fired and light is emitted upwardly so that it strikes an interior surface of the collimating portion 40 (e.g., an interior surface of the paraboloid cavity 50), which is metalized or otherwise reflective. Because of the geometry of the reflective cavity 50 and the location of the LED at or near a focal point of the paraboloid cavity, the light reflects from the interior surface of collimating portion 40 in a substantially collimated or parallel fashion towards the light spreading portion 42 (perfect collimation may not be possible due to manufacturing tolerances, the location and size of the LEDs, etc.). When the light reflects off of an interior surface of the spreading portion 42 with its various individual reflective features (e.g., an interior surface of an array of curved facets 60), the light becomes angled downwards and begins to spread or scatter as it heads for the window or opening 80 at the bottom of the housing 30. The light then passes through the window 80 and the lens 36 in a refracted or non-refracted manner as it exits the illumination device 14. The facets 60 may cause the light 22 to spread, but in a generally controlled manner so that the light can be directed to a particular area or region of interest. It should be appreciated that the terms "collimated," "collimating" and "collimated fashion," as used herein, broadly refer to any reflected light that is at least substantially collimated so that light rays in that area are generally parallel to one another (perfect collimation or parallelism is not required). Similarly, the terms "spread," "spreading" and "spread fashion," as used herein, broadly refer to any reflected light that is at least substantially spread or spreading so that light rays in that area are generally non-parallel to one another and are disbursing or diverging from one another (perfect distribution or non-parallelism is not required).

Once the light leaves the illumination device 14, the directed light may illuminate any suitable region. It should be appreciated that the spreading of the light is configurable according to the arrangements and characteristics of the facets 60 (e.g., their shape, size, quantity, arrangement, curvature, angularity, density, etc.), as well as the shape and size of the gap 80. In at least one embodiment, it should be appreciated that the z-axis of the illumination device 14 can be generally parallel to a longitudinal vehicle centerline CL. Further, the z-axis may be partially offset to the driver's side (e.g., so that a back-up camera may be located in opening 24a (FIG. 2) of the panel 16 along the vehicle's centerline ($C_L$)). In this implementation, the facets 56 may be configured so as to direct the light towards the vehicle centerline (e.g., where the vehicle hitch 12 is likely to be), which is not directly along the z-axis but is angled slightly. Of course, this vehicle embodiment is merely an example; other uses also exist, as discussed above.

Other embodiments also exist. For example, the housing may comprise a single paraboloid cavity 50, or it may comprise two or more paraboloid cavities 50. In some implementations, the longitudinal axes of the cavities 50 may be parallel. In other embodiments, at least two of these axes may be skewed, offset, or otherwise non-parallel.

In other embodiments, the housing 30 may differ from that described herein. For example the side walls 58 may be omitted. For example, the collimating and spreading portions 40, 42 may extend to the flange 44 instead.

In at least one embodiment, the spreading portion 42 may be replaced with a different portion which does not spread the light, but instead redirects the light in a collimated beam or focuses the light (e.g., converges the light). Or, the illumination device may be modified so that light from the light source initially reflects off of the light spreading portion and then reflects off of the light collimating portion so that the light exiting the illumination device is substantially collimated as opposed to substantially spread. Other implementations also exist and will be apparent to skilled artisans in view of the disclosure above.

Thus, there has been described an illumination device that includes at least a circuit card assembly having a light source and carried at least partially within a housing. The housing may include a collimating portion and a spreading portion. In operation, the device is adapted to emit light from the light source(s) towards the collimating portion, collimate at least some of the light as it reflects from the collimating portion towards the spreading portion, and then redirect the light as it reflects from the spreading portion towards a window between the housing and the circuit card. Thereafter, the light may or may not pass through a lens as it heads towards an intended target region.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An illumination device, comprising:
a housing that includes a light collimating portion and a light spreading portion, wherein the light collimating portion makes up an integral portion of a wall of the housing and the light spreading portion makes up an integral portion of a wall of the housing such that the housing with the light collimating portion and the light spreading portion is a single unitary component; and
a circuit card assembly that includes at least one light source, wherein the illumination device is arranged so that light emitted by the light source reflects first off of an interior surface of the light collimating portion and then off of an interior surface of the light spreading portion before exiting the illumination device, wherein the circuit card assembly with the at least one light source is mounted so as to at least partially block and define a window for the light emitted by the light source to exit the illumination device, wherein the circuit card assembly covers a substantial portion of a footprint of the housing, but stops short of covering the entire footprint of the housing so that the window is formed where light can escape an interior space, and wherein the substantial portion is at least 50% of the footprint of the housing.

2. The illumination device of claim 1, wherein the housing made of a molded plastic.

3. The illumination device of claim 1, wherein the light collimating portion includes at least one reflective cavity that is smooth and parabolic or paraboloid in shape, the reflective cavity is arranged so that light emitted by the light source reflects off of an interior surface of the reflective cavity in a collimated fashion towards the light spreading portion.

4. The illumination device of claim 3, wherein the light source is located on the circuit card assembly at or near a focal point of the parabolic or paraboloid shaped reflective cavity.

5. The illumination device of claim 3, wherein a greatest dimension of the reflective cavity extends along a longitudinal axis (z-axis) from a base area of the housing to an apex area of the housing, the longitudinal axis (z-axis) is parallel to a center line (CL) of a vehicle.

6. The illumination device of claim 1, wherein the light collimating portion includes a plurality of reflective cavities that are side-by-side, each of the plurality of reflective cavities corresponds to a separate light source.

7. The illumination device of claim 1, wherein the light spreading portion includes a plurality of individual reflective features, the plurality of individual reflective features are arranged so that light reflected from the light collimating portion reflects off interior surfaces of the plurality of individual reflective features and spreads before exiting the illumination device.

8. The illumination device of claim 7, wherein each of the plurality of individual reflective features is a curved rectangular-shaped facet.

9. The illumination device of claim 7, wherein the plurality of individual reflective features are arranged in a matrix-type distribution having rows and columns of individual reflective features.

10. The illumination device of claim 1, wherein the light collimating portion is convex in that it bows away from the light source, the light spreading portion is also convex in that it bows away from the light source, and the light collimating portion and the light spreading portion join one another at an apex area.

11. The illumination device of claim 10, wherein the apex area is a ridge that includes a plurality of humps or peaks, each of the plurality of humps or peaks corresponds to a separate reflective cavity of the light collimating portion.

12. The illumination device of claim 1, wherein the light collimating portion is concave in that it bows towards the light source, the light spreading portion is also concave in that it bows towards the light source, and the light collimating portion and the light spreading portion join one another at an apex area.

13. The illumination device of claim 1, wherein the interior surfaces of the light collimating portion and the light spreading portion are both metallized with a reflective coating.

14. The illumination device of claim 1, wherein the housing further includes first and second flat end portions, and wherein the light collimating portion, the light spreading portion, and the first and second flat end portions largely define the interior space where the circuit card assembly is located.

15. The illumination device of claim 1, wherein the circuit card assembly further includes a plurality of light sources in the form of top-firing light emitting diodes (LEDs).

16. The illumination device of claim 1, wherein the illumination device does not include a separate heat sink that is coupled to the circuit card assembly and transfers heat from the circuit card assembly.

17. The illumination device of claim 1, wherein the illumination device further comprises a lens that is attached to the housing and helps seal the circuit card assembly within an interior space of the housing so that the circuit card assembly is protected from contaminants.

18. The illumination device of claim 1, wherein the illumination device is mounted in a rear hatch exterior panel of a vehicle adjacent to a backup camera, the illumination device is arranged to illuminate a trailer hitch region so that the backup camera can capture properly illuminated images of the trailer hitch region when the vehicle is in reverse.

19. An illumination device, comprising:
a housing having a domed portion that includes a light collimating portion and a light spreading portion and is a single unitary component made of a molded plastic, the light collimating portion includes at least one reflective cavity with a metalized interior surface, and the light spreading portion includes a plurality of individual reflective features with metalized interior surfaces, wherein the light collimating portion makes up a part of the domed portion of the housing and the light spreading portion makes up another part of the domed portion of the housing;
a circuit card assembly that is attached to the housing and includes at least one top-firing light emitting diode (LED), the circuit card assembly covers a substantial portion of a footprint of the housing, but stops short of covering the entire footprint of the housing so that a window is formed where light can escape an interior space of the housing, wherein the circuit card assembly with the at least one top-firing LED is mounted so as to at least partially block and define a window for the light emitted by the at least one top-firing LED to exit the illumination device, and wherein the substantial portion is at least 50% of the footprint of the housing; and
a lens that is attached to the housing, wherein the illumination device is arranged so that: is arranged light emitted by the top-firing LED reflects off of the metalized interior surface of the reflective cavity in a collimated fashion and travels towards the light spreading portion, the collimated light reflects off of the metalized interior surfaces of the individual reflective features in a spread fashion and travels towards the window, and the spread light passes through the window and the lens and travels towards an intended target region.

20. A method of operating an illumination device that comprises a housing with a light collimating portion and a light spreading portion and a circuit card assembly with at least one light source, wherein the light collimating portion and the light spreading portion are integrally formed so as to make up a domed portion of the housing, wherein the circuit card assembly with the at least one light source is mounted so as to at least partially block at least 50% of a footprint of the housing and define a window for the light emitted by the light source to exit the illumination device, the method comprises the steps of:
(a) powering the circuit card assembly so that the light source emits light towards the light collimating portion of the housing;
(b) arranging the illumination device so that the emitted light reflects off of an interior surface of the light collimating portion in a collimated fashion so that it travels towards the light spreading portion;
(c) arranging the illumination device so that the collimated light reflects off of an interior surface of the light spreading portion in a spread fashion so that it travels towards an opening at the bottom of the housing; and
(d) allowing the spread light to exit the opening at the bottom of the housing so that it travels towards an intended target region.

* * * * *

UNITED STATES PATENT AND TRADEMARK OFFICE
CERTIFICATE OF CORRECTION

Page 1 of 1

PATENT NO. : 10,875,444 B2
APPLICATION NO. : 15/433800
DATED : December 29, 2020
INVENTOR(S) : Todd Irgang et al.

It is certified that error appears in the above-identified patent and that said Letters Patent is hereby corrected as shown below:

In the Claims

Claim 2, Column 9, Line 55, replace "....wherein the housing made of a molded plastic." with "....wherein the housing is made of a molded plastic."

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*